United States Patent [19]

Kim

[11] Patent Number: 4,936,464
[45] Date of Patent: Jun. 26, 1990

[54] PACKAGE IN COMBINATION WITH A TEAR BAND DEVICE

[76] Inventor: Myun H. Kim, 37-57 80 St. #D37, Jackson Height, N.Y. 11372

[21] Appl. No.: 77,443

[22] Filed: Jul. 24, 1987

[51] Int. Cl.⁵ .............................................. B65D 3/26
[52] U.S. Cl. .................................... 206/617; 206/616; 229/136
[58] Field of Search ............... 206/608, 605, 611, 616, 206/617, 626, 629, 630, 631, 633; 229/125.34, 125.35, 125.39, 132, 133, 136

[56] References Cited

U.S. PATENT DOCUMENTS

| | | | |
|---|---|---|---|
| 1,032,026 | 7/1912 | Roden | 206/617 |
| 2,771,385 | 11/1956 | Humphner | 206/616 |
| 3,504,844 | 4/1970 | Stark et al. | 206/617 |
| 3,592,380 | 7/1971 | Gerard | 206/616 |
| 3,599,859 | 8/1971 | Maierson | 206/616 |
| 4,621,736 | 11/1986 | Roccaforte | 206/616 |

FOREIGN PATENT DOCUMENTS 1194016 6/1970 United Kingdom ............... 206/606

*Primary Examiner*—Willis Little
*Attorney, Agent, or Firm*—Schweitzer & Cornman

[57] ABSTRACT

A device for opening a package which comprises a sealing tape, a band or thread adhesively attached to the inside surface of the sealing tape, and a pair of adhesive portions pasted by an adhesive whereby when the band or thread is freed from the package and pulled away from the package, the package can be readily opened with a straight tear line which extends along the surface of the package.

11 Claims, 1 Drawing Sheet

U.S. Patent  Jun. 26, 1990  4,936,464
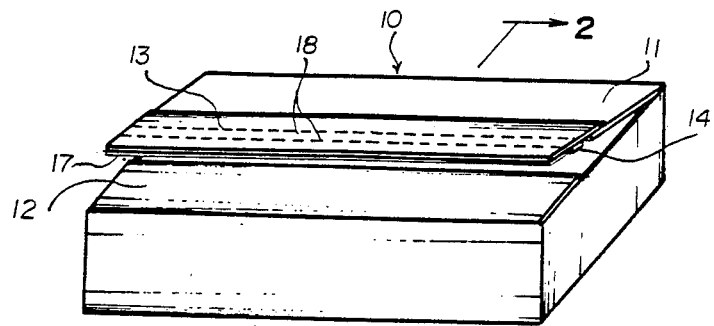
Fig 1
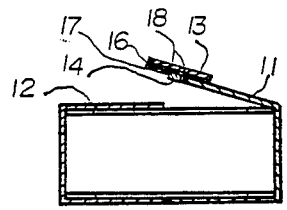
Fig 2
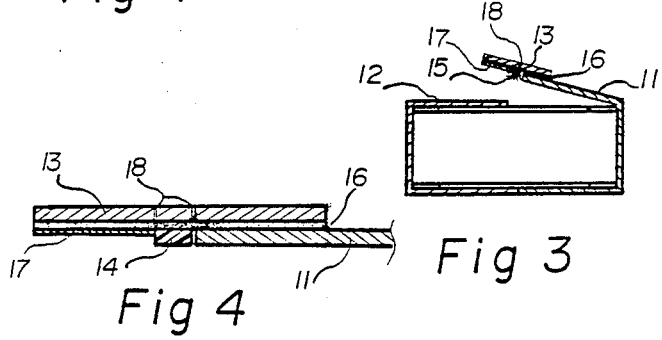
Fig 3
Fig 4
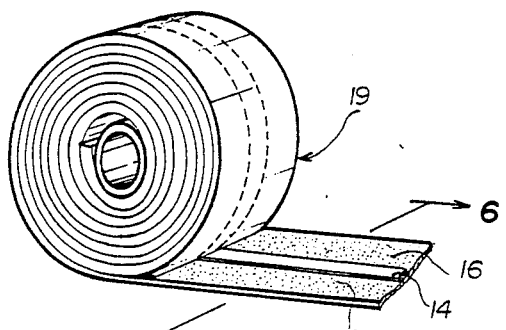
Fig 5
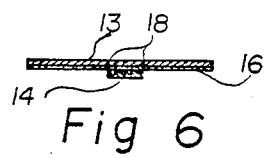
Fig 6
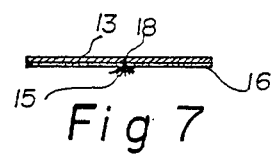
Fig 7

PACKAGE IN COMBINATION WITH A TEAR BAND DEVICE

BACKGROUND OF THE INVENTION

The present invention relates to a tear band opening device and more particularly, to a package, for example, a container in combination with a sealing tape having a tear band opening device, the sealing tape containing a thread or a band positioned at the inside thereof, within perforated punch lines between adjacent adhesive portions pasted thereon which is adapted to be used for easily and readily opening the container.

Many types of packages have been developed in the prior art to facilitate the opening of the package. For example, packages have been designed with dotted punch lines disposed along one surface thereof. Also, packages contain a thread positioned along the bottom thereof. However, these packages suffer from a number of disadvantages, such as they are difficult to open easily and thus an opening device, such as a paper opener, must be used for opening these envelopes. Also the prior art devices produce zigzag cuts when using thread positioned along the bottom of a container for opening the container. Furthermore, to place the tear strip containing the thread at positions other than at the bottom crease of a package is very difficult.

Accordingly, to the U.S. Ser. Nos. 901,744 filed by Aug. 29, 1986 (now U.S. Pat. No. 4,795,035, issued Jan. 3, 1989), 901,741 filed by Aug. 29, 1986, 947,806 filed by Dec. 30, 1986 and 042,787 filed by Apr. 27, 1986, and U.S. Design Pat. Ser. Nos. 901,942 filed by Aug. 29, 1987 and 947,966 filed Dec. 30, 1986 entitled "tear strip opening device" owned by the inventor of the present invention, it is to be noted that the inventions do not disclose the use of a sealing tape including a tear strip opening device, which attaches to on a space disposed between a pair of outside covers of a package.

OBJECTS AND SUMMARY OF THE INVENTION

Accordingly, it is an object of the present invention to provide a tear band opening device for use in producing a straight opening in a package in an easy manner.

Another object of the present invention is to provide a package which utilizes a woolen thread or a non-tearable band tightly pasted by an adhesive thereon to facilitate the easy opening of the package.

A further object of the present invention is to provide a container in with combination a sealing tape containing a thread or a band positioned along any portion of the bottom side thereof, e.g., along perforated punch lines and disposed between adjacent adhesive portions thereon. For example, the band or thread can be positioned along the middle, top, or bottom of the sealing tape where it is sealed with an adhesive on the inside surface thereof and the thread is positioned between adjacent adhesive portions disposed on the same side thereof.

Still a further object of the present invention is to provide a container which provides a space disposed between a pair of outside covers thereof when the container closes and an opening device is utilized on the space thereof to facilitate the easy and ready opening of the container.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to a container in combination with a sealing tape containing a tear band device for opening any type of container, such as a carton, an envelope or the like which comprises a thread or a band disposed along the center of a sealing tape which is correspondingly disposed on a space when the container closes and parallel adhesive portions pasted on the sealing tape which dispose on same sides of the thread or the band. Thus by pulling the one end of the band or thread away from the container, the thread or band tears the surface of the container in the area between the parallel adhesive portions.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view of package having the sealing tape which includes the tear band device disposed at the middle portion thereof according to the present invention;

FIG. 2 is a cross-sectional view of FIG. 1 taken along line 2—2, showing the sealing tape of the package including the tear band of the present invention;

FIG. 3 is a cross-sectional view of FIG. 1 taken along line 2—2, showing the sealing tape in the package including a non-tearable thread;

FIG. 4 is an enlarged cross-sectional view FIG. 1 taken along line 2—2, showing the sealing tape in the package including the tear band;

FIG. 5 is a perspective view of a sealing tape of another embodiment of the present invention;

FIG. 6 is a cross-sectional view of FIG. 5 taken along line 6—6, showing the tear band; and FIG. 7 is a cross-sectional view of FIG. 5 taken along line 6—6, showing the non-tearable thread.

DETAILED DESCRIPTION OF THE INVENTION

Referring now in detail to the drawings for the purpose of illustrating the present invention, FIGS. 1 and 4 show package 10 and a band 14 or a thread 15 having a plurality of woolen hairs which is attached by an adhesive 16 to the bottom surface of a sealing tape 13. The sealing tape 13 includes top and a bottom side. The bottom side is provided with the adhesive 16. The band 14 or thread 15 in the bottom side of the sealing tape 13 is positioned between small adjacent wet adhesive portion pasted by wet adhesive 16 (FIG. 4). The band 14 or thread 15 is disposed within perforated punch lines 18 (FIGS. 1 and 2) or perforated punch line 18 (FIG. 3), respectively. The adhesive portions pasted by adhesive 16 are disposed substantially parallel to each other and to the band 14 or thread 15. As shown in FIGS. 2 and 3, one wet adhesive portion of the sealing tape 13 tightly attached to one outside cover 11 and the other wet adhesive portion of the sealing tape 13 is releasably sealed by a cellophane tape 17. Advantageously, after the cellophane tape 17 is removed from the sealing tape 13 and the sealing tape 13 attaches to the other outside cover 12, the package 10 is tightly sealed. The package 10 can be made of paper, plastic, or the like. The band 14 or thread 15 can be made of any type of material which is sufficiently strong to cut paper or plastic products. Suitable band 14 or thread 15 materials include cotton, synthetic fiber, aluminum, stainless steel or the like.

Another embodiment of the present invention is an envelope (not shown) in combination with a sealing tape including the tear band device, which is positioned along the space between outside covers thereof.

In still another embodiment as shown in FIGS. 5, 6 and 7, the opening device of the present invention can be used in the form of a sealing tape 13 which can be used to seal packages of various types. Thus the sealing tape 13, for example, which contains a dry or wet adhesive 16 on one side thereof can be further provided with a band 14 or thread 15. The band 14 or thread 15 is adhesively attached to the dry adhesive side of the sealing tape 13. The band 14 or thread 15 is disposed within perforated punch lines 18 (FIGS. 5 and 6) or perforated punch line 18 (FIG. 7). The sealing tape which can be stored in a roll 19 can be merely unwound and used to seal packages by wetting the dry adhesive 16 and attaching it to the package. When it is later desired to open the package, the band 14 or thread 15 is freed-up at the free end of the tape 13 and pulled away from the package to tear the sealing tape and thereby open the package. The band 14 or thread 15 is made of plastic, aluminum, stainless steel, or the like. The sealing tape 13 is made of paper, plastic, cloth, or the like.

In operation, the paper or plastic to be formed into a package 10 is provided with the band 14 or the thread 15 having a plurality of woolen hairs attached by adhesive 16 to the bottom side of sealing tape 13. Along the band 14 or thread 15 of the sealing tape 13, the perforated punch lines or line are provided within a pair of adhesive portions having the adhesive 16. Thus the band 14 or thread 15 and the adhesive portions having the adhesive 16 are disposed substantially parallel to each other. When one end of the band 14 or thread 15 is pulled away from the package 10, a straight tear line is produced in the package because of the plastic or aluminum band or thread or wire which prevent the tear line from becoming irregular.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A package in combination with a tear band device which comprises:
   a package including a pair of covers which fold toward each other across the top of the package to form a small space therebetween,
   a sealing tape having a top and bottom side, said bottom side being provided with an adhesive, and
   a non-tearable tear band attached to said bottom side of the sealing tape, dividing the bottom side thereof into two portions, said sealing tape being provided with perforated punch lines extending along both edges of the tear band and for the entire length of the tear band, one bottom side of the sealing tape being adhesively attached to one outside cover of the package and the other bottom side of the sealing tape being adhesively covered with a cellophane tape whereby when it is desired to adhesively attach the cellophane covered tape to the other outside cover of the package, the cellophane tape is removed from said bottom side so that the package can be closed, with the tear band extending into the small space disposed between said outside covers, and whereby said package can thereafter be readily opened by pulling one end of the tear band away from the package against the perforated punch lines which extend along the sealing tape to produce a straight tear along the perforated punch lines of the sealing tape.

2. The device of claim 1 wherein the non-tearable band is made of plastic.

3. The device of claim 1 wherein the non-tearable band is made of aluminum.

4. The device of claim 1 wherein the non-tearable band is made of stainless steel.

5. The device of claim 1 wherein the non-tearable band is a thread.

6. The device of claim 5 wherein the thread contains a plurality of woolen hairs.

7. The device of claim 5 wherein the thread is made of synthetic fiber.

8. The device of claim 5 wherein the thread is stainless steel wire.

9. The device of claim 5 wherein the thread is aluminum wire.

10. The device of claim 1 wherein the thread is made of cotton.

11. The device of claim 1 wherein the sealing tape is positioned along at least one side of the package.

* * * * *